(12) United States Patent
Baek et al.

(10) Patent No.: US 7,534,855 B2
(45) Date of Patent: May 19, 2009

(54) METHOD OF PREPARING VINYLCHLORIDE-BASED RESIN CAPABLE OF PRODUCING PLASTISOL WITH LOW VISCOSITY, VINYLCHLORIDE-BASED RESIN PREPARED USING THE METHOD, METHOD OF PREPARING VINYLCHLORIDE-BASED PLASTISOL, AND VINYLCHLORIDE-BASED PLASTISOL PREPARED USING THE METHOD

(75) Inventors: Yoonjeong Baek, Seongnam (KR); Kyung Hyun Kim, Seoul (KR); Hyunkyou Ha, Yeosu (KR); Chan Hee Lee, Jeonju (KR)

(73) Assignee: LG Chem, Ltd. (KR)

( * ) Notice: Subject to any disclaimer, the term of this patent is extended or adjusted under 35 U.S.C. 154(b) by 180 days.

(21) Appl. No.: 11/554,336

(22) Filed: Oct. 30, 2006

(65) Prior Publication Data

US 2007/0100104 A1 May 3, 2007

(30) Foreign Application Priority Data

Oct. 31, 2005 (KR) .............. 10-2005-0103259
Sep. 8, 2006 (KR) .............. 10-2006-0086995

(51) Int. Cl.
*C08F 6/24* (2006.01)
*C08F 6/14* (2006.01)
*C08J 3/18* (2006.01)

(52) U.S. Cl. .............. 528/486; 528/487; 528/490; 528/502 E; 524/569

(58) Field of Classification Search .............. 528/486, 528/490, 502 E, 487; 524/569
See application file for complete search history.

(56) References Cited

U.S. PATENT DOCUMENTS

| 2,647,103 | A | * | 7/1953 | Griffith et al. | .............. 528/487 |
| 3,725,375 | A | * | 4/1973 | Sturt | .............. 526/201 |
| 3,883,494 | A | * | 5/1975 | Winter et al. | .............. 34/282 |
| 4,133,947 | A | * | 1/1979 | Kalka et al. | .............. 528/502 E |
| 4,581,413 | A | * | 4/1986 | Kim | .............. 525/221 |
| 4,960,864 | A | * | 10/1990 | Lindner et al. | .............. 528/486 |
| 5,574,110 | A |   | 11/1996 | Yoo et al. | |
| 6,723,764 | B2 | * | 4/2004 | Sakabe | .............. 523/319 |

FOREIGN PATENT DOCUMENTS

| JP | 52016590 | 2/1977 |
| JP | 61043609 | 3/1986 |
| JP | 2001172303 | 6/2001 |
| KR | 100380015 B1 | 4/2003 |

OTHER PUBLICATIONS

International Search Report; International Application No. PCT/KR2006/004348; International Filing Date Oct. 24, 2006; Applicant's File Reference LG-28515-PCT; Date of Mailing: Jan. 23, 2007; 4 pages.
Korean Office Action dated Aug. 27, 2007 citing document that was previously reported on Apr. 16, 2007.

* cited by examiner

*Primary Examiner*—Fred M Teskin
(74) *Attorney, Agent, or Firm*—Cantor Colburn LLP

(57) ABSTRACT

Provided is a method of preparing a vinylchloride-based resin. The method includes adding to a vinylchloride-based latex an acid, preferably, 1-7 parts by weight of the acid based on 100 parts by weight of a solid of the vinylchloride-based latex; optionally, incubating the resultant mixture at a temperature of 30~60° C. for 30 minutes to 3 hours; and drying the mixture. Therefore, it is possible to reduce the viscosity of a vinylchloride-based plastisol, thereby improving the processability of the plastisol.

8 Claims, No Drawings

METHOD OF PREPARING VINYLCHLORIDE-BASED RESIN CAPABLE OF PRODUCING PLASTISOL WITH LOW VISCOSITY, VINYLCHLORIDE-BASED RESIN PREPARED USING THE METHOD, METHOD OF PREPARING VINYLCHLORIDE-BASED PLASTISOL, AND VINYLCHLORIDE-BASED PLASTISOL PREPARED USING THE METHOD

CROSS-REFERENCE TO RELATED PATENT APPLICATION

This application claims priority from Korean Patent Application No. 10-2005-0103259 filed on Oct. 31, 2005 and No. 10-2006-0086995 filed on Sep. 8, 2006, in the Korean Intellectual Property Office, the disclosures of which are incorporated herein in their entireties by reference.

1. Field of the Invention

The present invention relates to a method of preparing a vinylchloride-based resin capable of producing a plastisol from a vinylchloride-based latex, and more particularly, to a method of preparing a vinylchloride-based resin having a low viscosity suitable for plastisol processing from a vinylchloride-based latex, and a vinylchloride-based resin prepared using the method.

2. Description of the Related Art

Plastisols prepared from vinylchloride-based resins are used for processing of various products, for example, flooring and wall coatings, plasticized coating fabrics, and mastic resins.

The processing of products using vinylchloride-based plastisols requires good processability. For this, the vinylchloride-based plastisols must satisfy a low viscosity.

Conventionally, in order to reduce the viscosity of a sol during paste processing of a vinylchloride-based resin, a method of producing a plastisol by mixing a vinylchloride-based paste resin prepared by emulsion polymerization and about 10-20 wt % of a resin having a greater particle size than the vinylchloride-based paste resin and combining the resin mixture with a plasticizer and additives has been suggested. According to this method, a pore size is reduced by mixing and filling of resins having different particle sizes, thereby reducing an area for plasticizer absorption, resulting in a reduction in viscosity of a sol during paste processing. However, plasticizer absorption is closely related to the particle sizes and sphericity of mixed resins, and thus, there arise problems of using a technique of adjusting the sphericity and particle size of final particles and mixing separately prepared resins.

As another method for reducing the viscosity of a plastisol, when preparing a plastisol by mixing a vinylchloride-based resin with a plasticizer and additives, a diluent can be used as an additive. However, the diluent used herein is mainly a volatile material, thereby causing environmental problems. This restricts the applications of final products.

In addition, there is a method of preparing a resin from a latex polymer, which includes agglomeration, aging, storing, dehydration, and drying of the latex polymer, to obtain resin agglomerates with a low viscosity suitable for processing of a vinylchloride-based plastisol. However, a continuous process management is required and maintenance costs are incurred.

SUMMARY OF THE INVENTION

While searching for a solution to the above problems, the present inventors have found that the addition of an acid to a vinylchloride-based resin latex and the spray drying of the resultant mixture enables to produce a plastisol having a low viscosity suitable for paste resin processing, unlike conventional technologies, and thus, have completed the present invention.

Therefore, the present invention provides a method of preparing a vinylchloride-based resin capable of producing a plastisol having a low viscosity suitable for paste resin processing.

The present invention also provides a vinylchloride-based resin prepared using the method.

The present invention also provides a method of preparing a vinylchloride-based plastisol having a low viscosity suitable for paste resin processing.

The present invention also provides a vinylchloride-based plastisol prepared using the method.

According to an aspect of the present invention, there is provided a method of preparing a vinylchloride-based resin, the method including: adding an acid to a vinylchloride-based latex to prepare a mixture; and drying the mixture.

The vinylchloride-based latex may include 20~60 wt % of a solid.

The acid may be added in an amount of 1-7 parts by weight based on 100 parts by weight of the solid of the vinylchloride-based latex.

The vinylchloride-based latex may be prepared by a method selected from the group consisting of emulsion polymerization, microsuspension polymerization for a single particle size distribution, and seeded microsuspension polymerization for two or more particle size distributions.

The acid may be an inorganic acid selected from the group consisting of a hydrochloric acid, a sulfuric acid, a nitric acid, and a phosphoric acid.

The acid may be an organic acid selected from the group consisting of an acrylic acid, an acetic acid, a methacrylic acid, a methyl acrylic acid, a fumaric acid, and a maleic acid.

The drying may be spray drying.

The spray drying may be performed at a temperature of 150~200° C.

The method may further include incubating the mixture at a temperature of 30~60° C. for 30 minutes to 3 hours, after the adding of the acid.

According to another aspect of the present invention, there is provided a vinylchloride-based resin prepared using the method.

According to another aspect of the present invention, there is provided a method of preparing a vinylchloride-based plastisol, which includes mixing a vinylchloride-based resin prepared using the method with a plasticizer.

According to a further aspect of the present invention, there is provided a vinylchloride-based plastisol prepared using the method.

DETAILED DESCRIPTION OF THE INVENTION

The present invention will now be described in more detail.

The present invention provides a method of preparing a vinylchloride-based resin, the method including: adding an acid to a vinylchloride-based latex to prepare a mixture; optionally, incubating the mixture at a temperature of 30~60° C. for 30 minutes to 3 hours; and drying the mixture.

Hereinafter, the method of preparing the vinylchloride-based resin according to the present invention will be described step by step.

Addition of Acid

First, the method of preparing the vinylchloride-based resin according to the present invention includes adding an acid to a vinylchloride-based latex.

The vinylchloride-based latex used herein may be prepared by emulsion polymerization of vinylchloride monomers or a mixture of a vinylchloride monomer and its comonomer in an aqueous medium in the presence of an emulsifier and a water-soluble polymerization initiator, microsuspension polymerization (for single particle size distribution) or seeded microsuspension polymerization (for two or more particle size distributions) of vinylchloride monomers or a mixture of a vinylchloride monomer and its comonomer in the presence of an emulsifier and an oil-soluble polymerization initiator.

The content of a solid in the vinylchloride-based latex is not particularly limited, but may be generally 20~80 wt %, preferably 20~60 wt %, and more preferably, 40~60 wt %.

The comonomer capable of copolymerizing with the vinylchloride monomer may be a halogenated vinyl monomer such as vinylidene chloride; vinyl ester such as vinyl acetate, vinyl propionate, or vinyl stearate; an unsaturated monobasic acid such as acrylic acid, methacrylic acid, or itaconic acid; vinyl ether such as methyl vinyl ether, ethyl vinyl ether, octyl vinyl ether, or lauryl vinyl ether; maleic or fumaric acid and an anhydride thereof; alkyl ester of unsaturated dibasic acid; unsaturated acid nitrile; or the like. Two or more comonomers may also be used.

The polymerization initiator used in the preparation of the vinylchloride-based latex may be a water-soluble oxidation-reduction initiator, e.g., persulfate (e.g., sodium persulfate, potassium persulfate, or ammonium persulfate), water-soluble peroxide (e.g., hydrogen peroxide), or persulfate/peroxide and a reducing agent (e.g., sodium sulfite, sodium pyrosulfite, ammonium sulfite, sodium hydrogen sulfite, ascorbic acid, or sodium formaldehyde sulfoxylate); a monomer-soluble (oil-soluble) initiator, e.g., azobisisobutyronitrile, azobis-2,4-dimethylvaleronitrile, lauroyl peroxide, or t-butylperoxide pivalate; or a combination of the water-soluble oxidation-reduction initiator and the monomer-soluble initiator.

The emulsifier used in the preparation of the vinylchloride-based latex may be selected from salts of sulfuric acid esters of higher alcohols (e.g., alkaline metal salts or ammonium salts), alkyl benzene sulfates (e.g., alkaline metal salts or ammonium salts), higher fatty acid salts (e.g., alkaline metal salts or ammonium salts), other anionic, non-ionic, and cationic surfactants. The surfactants may be used alone or in combination of two or more thereof. The anionic surfactants are particularly preferred. The anionic and/or non-ionic surfactants may also be added during or after latex preparation.

A reagent for adjusting degree of polymerization or other additives may also be used in the preparation of the vinylchloride-based latex. The reagent for adjusting the degree of polymerization may be a chain transfer agent, e.g., trichloroethylene, carbon tetrachloride, 2-mercaptoethanol, or octylmercaptan, or a crosslinking agent, e.g., diallyl phthalate, triallyl isocyanurate, ethylene glycol diacrylate, or trimethylolpropane triacrylate.

As other additives, there may be used a water-soluble transition metal salt such as cuprous chloride, ferrous sulfate, or. nickel nitrate, and a pH adjustor such as alkaline metal monohydrogen or dihydrogen phosphate, potassium hydrogen phthalate, or sodium hydrogen carbonate.

In the present invention, the acid is added to the vinylchloride-based latex prepared as described above. The vinylchloride-based latex particles are stabilized by anions of an emulsifier in the vinylchloride-based latex particles. However, when the acid is added to the vinylchloride-based latex, a repulsive force among the latex particles disappears, thereby causing agglomeration of the latex particles. Even when dried using a spray-drying process, the latex particles are maintained in the form of agglomerates. Therefore, infiltration of a plasticizer into resultant vinylchloride-based resin particles obtained after the drying is prevented, thereby leading to a viscosity reduction.

The acid may be an inorganic acid or an organic acid. The inorganic acid may be selected from the group consisting of a hydrochloric acid, a sulfuric acid, a nitric acid, and a phosphoric acid, and the organic acid may be selected from the group consisting of an acrylic acid, an acetic acid, a methacrylic acid, a methyl acrylic acid, a fumaric acid, and a maleic acid.

In the present invention, these acids may be used alone or in combination of two or more thereof.

The acid may be added in an amount of 1-7 parts by weight based on 100 parts by weight of a solid of the vinylchloride-based latex.

If the content of the acid is less than 1 part by weight based on 100 parts by weight of the solid of the vinylchloride-based latex, a reduction in viscosity of a plastisol may be insufficient. On the other hand, if the content of the acid exceeds 7 parts by weight based on 100 parts by weight of the solid of the vinylchloride-based latex, unmolten particles may be left after plastisol processing, thereby causing surface irregularities of products.

After adding the acid to the vinylchloride-based latex, it is preferable to thoroughly stir the resultant mixture.

Incubation of Mixture

After adding the acid to the vinylchloride-based latex, the resultant mixture may be incubated at a temperature of 30~60° C. for 30 minutes to 3 hours. The incubation of the mixture is optional.

If the mixture is incubated at a temperature of less than 30° C., a time required for accomplishing a reduction in viscosity of a plastisol may increase. On the other hand, if the mixture is incubated at a temperature of more than 60° C., the melting of a plastisol may occur, thereby rapidly increasing the viscosity of the plastisol, thereby resulting in poor processability.

If the mixture is incubated for less than 30 minutes, a reduction in viscosity of a plastisol may not occur. On the other hand, if the mixture is incubated for more than 3 hours, the melting of a plastisol may occur, thereby rapidly increasing the viscosity of the plastisol, thereby resulting in poor processability.

Drying of Mixture

After adding the acid to the vinylchloride-based latex or incubating the mixture, the mixture is dried.

The drying is not particularly limited. Spray drying is preferred.

For example, the spray drying may be performed using a drying apparatus including therein a dual fluid nozzle. The drying apparatus may be an internal mixing type or an external mixing type. The drying apparatus may include a plurality of dual fluid nozzles. The spray drying may be performed using a common spray gas. For example, water vapor or a mixture of water vapor and an inert gas may be used as the spray gas. For example, the inert gas may be air, nitrogen, or neon.

A temperature of the spray gas is not particularly limited, but may be 25~300° C., preferably 40~250° C., and more preferably 50~100° C. If the temperature of the spray gas exceeds 300° C., the latex may be heated by the spray gas according to the shapes of supply pipes for the supply of the spray gas and the latex, thereby lowering the stability of the latex or causing the clogging of the latex supply pipe due to latex agglomeration. Thus, it is necessary to adjust the temperature of the spray gas according to the shapes of supply pipes so that the latex is not heated excessively.

The temperature for the spray drying, i.e., the temperature of dry air in the drying apparatus varies according to the supply amount (i.e., spray amount) of the latex. However, it is preferred that the temperature of dry air in an inlet of the drying apparatus is adjusted to 100~300° C., preferably 150~200° C., and the temperature of dry air in an outlet of the drying apparatus is adjusted to 25~90° C., preferably 40~80° C. If the temperature of the dry air in the inlet and the outlet of the drying apparatus is less than 100° C. and 25° C., respectively, a vinylchloride-based resin may be insufficiently dried or it may be difficult to maintain the temperature of dry air to a predetermined level. On the other hand, if the temperature of the dry air in the inlet and the outlet of the drying apparatus exceeds 300° C. and 90° C., respectively, the temperature of vinylchloride-based resin particles may exceeds the glass transition point of the vinylchloride-based resin particles. Thus, dried resin particles collide with each other to grow into coarse particles, and thus, dispersion of the resin particles among plasticizer particles may hardly occur, thereby making it difficult to obtain a satisfactory plastisol.

The present invention also provides a vinylchloride-based resin prepared using the above-described vinylchloride-based resin preparation method.

The present invention also provides a method of preparing a vinylchloride-based plastisol, which includes mixing a vinylchloride-based resin prepared using the above-described vinylchloride-based resin preparation method with a plasticizer.

The plasticizer used in the preparation of the plastisol is not particularly limited, but may be di(2-ethylhexyl)phthalate, dibutylphthalate, butyl benzyl phthalate, diisobutyl adipate, heptyl nonyl adipate, an epoxy derivative such as bis-(2-ethylhexyl)adipate epoxylated soybean oil, tributyl phosphate, butyl cyclohexyl phthalate, or the like. In addition, other additives such as a diluent and a thermal stabilizer may also be used.

The present invention also provides a vinylchloride-based plastisol prepared using the above-described vinylchloride-based plastisol preparation method.

The following working examples show that a vinylchloride-based plastisol according to the present invention has a significantly reduced viscosity and thus better processability, relative to a conventional plastisol.

Hereinafter, the present invention will be described more specifically with reference to the following working examples. The following working examples are for illustrative purposes only and are not intended to limit the scope of the invention.

EXAMPLE 1

10 kg of a vinylchloride-based latex prepared by common emulsion polymerization and having an average particle size of 1.2 μm and a solid content of 50 wt % was mixed with 200 g of acrylic acid. The resultant mixture was stirred at room temperature for one hour and spray-dried at 180° C. to prepare a vinylchloride-based resin for paste resin processing. 100 parts by weight of the vinylchloride-based resin thus prepared was mixed with 60 parts by weight of di-2-ethylhexylphthalate and 3 parts by weight of a Ca/Zn composite thermal stabilizer, and the resultant mixture was stirred to prepare a vinylchloride-based plastisol.

EXAMPLE 2

A vinylchloride-based plastisol was prepared in the same manner as in Example 1 except that 200 g of sulfuric acid was used instead of the acrylic acid.

COMPARATIVE EXAMPLE 1

10 kg of a vinylchloride-based latex prepared by common emulsion polymerization and having an average particle size of 1.2 μm and a solid content of 50 wt % was spray-dried at 180° C. to prepare a vinylchloride-based resin for paste resin processing.

100 parts by weight of the vinylchloride-based resin thus prepared was mixed with 60 parts by weight of di-2-ethylhexylphthalate and 3 parts by weight of a Ca/Zn composite thermal stabilizer, and the resultant mixture was stirred to prepare a vinylchloride-based plastisol.

EXPERIMENTAL EXAMPLE

Measurement of Viscosities of Plastisols

Measurement of Viscosities of Vinylchloride-Based Plastisols Prepared in Examples 1-2 and Comparative Example 1

Initial viscosities of the vinylchloride-based plastisols prepared in Examples 1-2 and Comparative Example 1 were measured.

The viscosity measurement was performed using a rotational viscometer (Brookfield), and the results are presented in Table 1 below. From Table 1 below, it can be seen that a vinylchloride-based plastisol prepared according to the present invention exhibits a significantly reduced viscosity.

TABLE 1

|  | Example 1 | Example 2 | Comparative Example 1 |
|---|---|---|---|
| Viscosity (cps) | 2300 | 2700 | 6000 |

As described above, according to the present invention, it is possible to reduce the viscosity of a vinylchloride-based plastisol, thereby improving the processability of the plastisol.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a vinylchloride-based resin, the method comprising:
   adding an acid to a vinylchloride-based latex to prepare a mixture; drying the mixture; and
   incubating the mixture at a temperature of 30~60° C. for 30 minutes to 3 hours. after the adding of the acid.

2. The method of claim 1, wherein the vinylchloride-based latex comprises 20~60 wt % of a solid.

3. The method of claim 1, wherein the acid is added in an amount of 1-7 parts by weight based on 100 parts by weight of a solid of the vinylchloride-based latex.

4. The method of claim 1, wherein the vinylchloride-based latex is prepared by a method selected from the group consisting of emulsion polymerization, microsuspension polymerization for a single particle size distribution, and seeded microsuspension polymerization for two or more particle size distributions.

5. The method of claim 1, wherein the acid is an inorganic acid selected from the group consisting of a hydrochloric acid, a sulfuric acid, a nitric acid, and a phosphoric acid.

6. The method of claim 1, wherein the acid is an organic acid selected from the group consisting of an acrylic acid, an acetic acid, a methacrylic acid, a methyl acrylic acid, a fumaric acid, and a maleic acid.

7. The method of claim 1, wherein the drying is spray drying.

8. The method of claim 7, wherein the spray drying is performed at a temperature of 150~200° C.

* * * * *